United States Patent
Adaikalasamy et al.

(10) Patent No.: US 10,120,965 B2
(45) Date of Patent: Nov. 6, 2018

(54) WAVEFORM BASED RECONSTRUCTION FOR EMULATION

(71) Applicant: Synopsys, Inc., Mountain View, CA (US)

(72) Inventors: Johnson Adaikalasamy, Sunnyvale, CA (US); Gagan Vishal Jain, Sunnyvale, CA (US); Stanislav Margolin, Andover, MA (US)

(73) Assignee: Synopsys, Inc., Mountain View, CA (US)

( * ) Notice: Subject to any disclaimer, the term of this patent is extended or adjusted under 35 U.S.C. 154(b) by 14 days.

(21) Appl. No.: 15/278,659

(22) Filed: Sep. 28, 2016

(65) Prior Publication Data

US 2017/0091360 A1    Mar. 30, 2017

Related U.S. Application Data

(60) Provisional application No. 62/235,483, filed on Sep. 30, 2015.

(51) Int. Cl.
*G06F 9/455* (2018.01)
*G06F 17/50* (2006.01)

(52) U.S. Cl.
CPC ...... *G06F 17/5027* (2013.01); *G06F 17/5031* (2013.01); *G06F 2217/84* (2013.01)

(58) Field of Classification Search
CPC ............. G06F 17/5027; G06F 17/5031; G06F 2217/84
See application file for complete search history.

(56) References Cited

U.S. PATENT DOCUMENTS

| | | | | |
|---|---|---|---|---|
| 6,009,256 A * | 12/1999 | Tseng | ............... | G06F 17/5027 703/13 |
| 6,389,379 B1 * | 5/2002 | Lin | ............... | G06F 17/5022 703/14 |
| 8,082,139 B1 * | 12/2011 | Ballagh | ............... | G06F 17/5027 702/4 |
| 8,265,918 B1 * | 9/2012 | Neema | ............... | G06F 17/5027 703/13 |
| 8,706,467 B2 * | 4/2014 | Rabinovitch | ....... | G06F 17/5009 703/13 |
| 9,286,424 B1 * | 3/2016 | Larzul | ............... | G06F 17/5027 |
| 9,372,947 B1 * | 6/2016 | Elmufdi | ............... | G06F 17/5027 |
| 9,852,244 B2 * | 12/2017 | Larzul | ............... | G06F 17/5027 |

(Continued)

OTHER PUBLICATIONS

PCT Invitation to Pay Additional Fees, PCT Application No. PCT/US17/61172, dated Jan. 24, 2018, 3 pages.

*Primary Examiner* — Nha Nguyen
(74) *Attorney, Agent, or Firm* — Fenwick & West LLP

(57) ABSTRACT

A disclosed system of an emulation environment performs a simulation to construct a waveform of a target signal based on signals traced by an emulator for a time frame including multiple clock cycles. In one embodiment, a simulation is performed in a manner that an input of the logic gate, in a first duration of the time frame at which an output of the logic gate depends on the input, is analyzed to obtain the output, and the input of the logic gate, in a second duration of the time frame at which the output of the logic gate is independent, is omitted. In one aspect, the input of the logic gate is simulated for the first duration based on a periodicity in a waveform of the input in the first duration.

20 Claims, 10 Drawing Sheets

(56) References Cited

U.S. PATENT DOCUMENTS

| | | | |
|---|---|---|---|
| 2002/0072889 A1 | 6/2002 | Hoffman et al. | |
| 2006/0036427 A1* | 2/2006 | Chaumont | G06F 17/5054 703/23 |
| 2009/0083682 A1* | 3/2009 | Akiba | G06F 17/5022 716/106 |
| 2010/0057426 A1 | 3/2010 | Reblewski | |
| 2010/0251192 A1* | 9/2010 | Nishide | G06F 17/505 716/106 |
| 2010/0280814 A1* | 11/2010 | Rabinovitch | G06F 17/5022 703/16 |
| 2013/0298102 A1* | 11/2013 | Kadkade | G06F 17/50 716/136 |
| 2014/0013290 A1* | 1/2014 | Lyons, Jr. | G06F 17/5045 716/106 |
| 2014/0032204 A1* | 1/2014 | Suresh | G06F 9/455 703/23 |
| 2014/0052430 A1* | 2/2014 | Suresh | G06F 17/5045 703/14 |
| 2016/0098505 A1* | 4/2016 | Larzul | G06F 17/5027 703/15 |
| 2016/0314239 A1* | 10/2016 | Rabinovitch | G06F 17/5081 |
| 2016/0328499 A1* | 11/2016 | Larzul | G06F 17/5027 |

* cited by examiner

WAVEFORM BASED RECONSTRUCTION FOR EMULATION

CROSS-REFERENCE TO RELATED APPLICATIONS

This application claims priority to and the benefit of U.S. Provisional Patent Application No. 62/235,483 filed on Sep. 30, 2015, which is incorporated herein by reference in its entirety.

BACKGROUND

1. Field of Art

The disclosure generally relates to the emulation of circuits, and more specifically to obtaining emulation results.

2. Description of the Related Art

Emulators have been developed to assist circuit designers in designing and debugging highly complex integrated circuits. An emulator includes multiple reconfigurable components, such as field programmable gate arrays (FPGAs) that together can imitate the operations of a design under test (DUT). By using an emulator to imitate the operations of a DUT, designers can verify that a DUT complies with various design requirements prior to fabrication.

One aspect of emulation includes emulating a DUT and retrieving emulation results from the emulator. Emulation results can be analyzed to verify, for example, timing relationships and digital logic operations of the DUT. In one approach, emulation results are transferred to another system for performing analysis. For example, waveforms of the emulation results are generated at another system to graphically represent timing relationships and digital logic operations of the DUT. In advanced processes (e.g., 22 nanometer ("nm") and below), a DUT may include billions of logic circuits and signals. Emulating such a complex DUT involves transferring an extremely large amount of data including states or values of billions of signals for a large number of clock cycles from the emulator to another system. This places a significant strain on computing resources (e.g., processing power, memory availability) as well as requiring large amounts of time to test a complex DUT. Therefore, conventional emulation environment is inefficient in terms of hardware and communication resources employed for transferring data without slowing down the emulator system.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
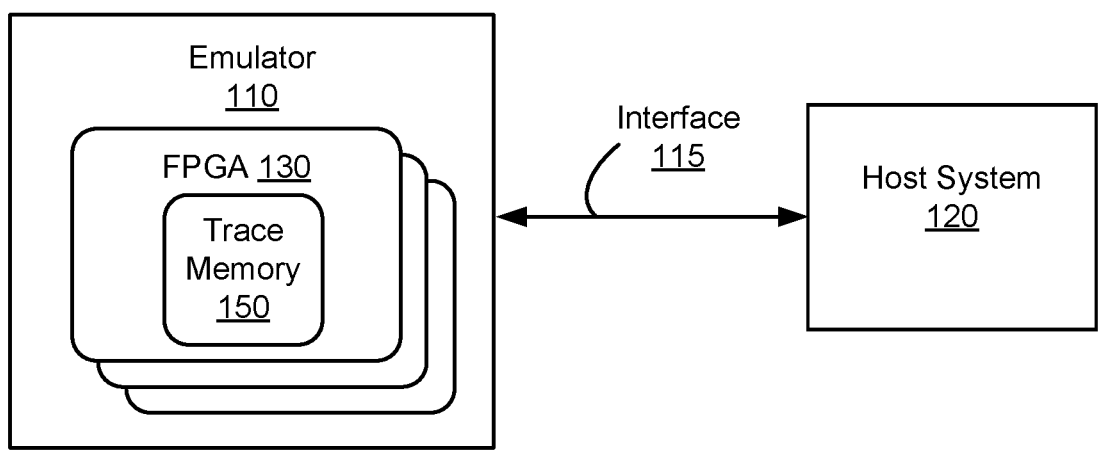
FIG. 1 is a block diagram of an emulation environment, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. It should be recognized from the following description that alternative embodiments of the structures and methods illustrated herein may be employed without departing from the principles described herein.

The figures use like reference numerals to identify like elements. A letter after a reference numeral, such as "230A," indicates that the text refers specifically to the element having that particular reference numeral. A reference numeral in the text without a following letter, such as "230," refers to any or all of the elements in the figures bearing that reference numeral.

Configuration Overview

A disclosed system of an emulation environment performs a simulation to construct a waveform of a target signal based on signals traced by an emulator for a time frame including multiple clock cycles. Emulation herein refers to imitating the behavior of an electronic design with configurable hardware components. Simulation herein refers to imitating the behavior of an electronic design with software models (e.g., sections). By simulating logic circuits based on emulated signals, the emulator can trace a fewer number of signals during emulation of a design under test (DUT), and the disclosed system can construct waveforms of a target signal to analyze the performance the DUT.

In one embodiment, simulation for a logic gate is performed per time frame including multiple clock cycles, rather than per clock cycle of the DUT. A time frame can be, for example, a time interval or multiple clock cycles that a DUT is emulated for. A waveform of an input signal per time frame is analyzed, and selected duration of the input signal is used for simulation, while non-selected duration of the input signal is omitted. Specifically, a simulation is performed in a manner that an input of the logic gate, in a first duration of the time frame at which an output of the logic gate depends on the input, is analyzed to obtain the output, and the input of the logic gate, in a second duration of the time frame at which the output of the logic gate is independent, is omitted. In one aspect, the logic gate is simulated based on a periodicity of the input in the first duration. For example, a periodic pattern in a waveform of the input of the logic gate in the first duration is detected, and an output of the logic gate is determined based on the detected periodic pattern and a number of periodic patterns repeated in the waveform in the first duration.

In one aspect, the disclosed system can simulate a large number of logic gates for a time frame by simulating a portion of the logic gates for a selected duration of the time frame. In one example, one or more logic gates, coupled to an input of a logic gate, can be simulated for a first duration of the time frame at which an output of the logic gate depends on the input of the logic gate, and a simulation of the one or more logic gates can be omitted for a second duration at which the output of the logic gate is independent of the input of the logic gate. Hence, a simulation speed of the logic gates can be improved, and simulation resources (e.g., processor capacity or storage space) can be conserved.

A logic gate (or a logic circuit) herein refers to a combinatorial logic gate, a sequential logic gate or any circuitry. A portion of the logic gates simulated can be a part of the DUT emulated by the emulator, or an additional circuitry to test a certain condition of the DUT (e.g., error detection or power analysis) that is not part of the DUT.

A signal herein refers to, but is not limited to, a net, a wire, a variable, a port, or an element of a design having a value carried, monitored or traced.

Emulation Environment

FIG. 1 is a block diagram illustrating an emulation environment 100, according to one embodiment. The emulation environment 100 includes an emulator 110 and a host system 120. The emulator 110 and the host system 120 communicate through an interface 115.

The interface 115 is a communication medium that allows communication between the host system 120 and the emulator 110. In one embodiment, the interface 115 is one or more cables with electrical connections. For example, the interface 115 may be one or more USB, LAN, optical, IEEE 1394 (FireWire), or custom built cables. In other embodiment, the interface 115 is a wireless communication medium or a network with one or more points of access. For another example, the interface 115 may be a wireless communication medium employing a Bluetooth® or IEEE 802.11 protocol. In one embodiment, the interface 115 is enabled during the operation of the host system 120 and the emulator 110. In one embodiment, the interface 115 is only enabled when the host system 120 and the emulator 110 need to exchange information with each other.

The emulator 110 is a hardware system that emulates designs under test (DUTs). A DUT includes one or more circuit designs. The DUT emulated can be either combinatorial, sequential, or a combination of both. The emulator 110 includes multiple field-programmable gate arrays (FPGAs) 130 that can be configured to emulate a DUT. Each FPGA 130 includes a trace memory 150 (e.g., trace buffer) that stores values of signals traced by the FPGA 130 during emulation (e.g., the states of DUT signals during emulation). In other embodiments, the emulator 110 includes other types of configurable logic circuits instead of FPGAs 130. In other embodiments, the emulator 110 includes one or more trace memories 150 separate from the FPGAs 130, where the one or more trace memories 150 can be used by multiple FPGAs 130 for storing data. In other embodiments, the emulator 110 includes a mix of FPGA 130 or other configurable circuits and a mix of memories located in the components or separated from them, in order to achieve an optimal trace system. In another embodiment, the emulator 110 does not contain memories dedicated to trace, and uses memories that could be used to model the design, or stream the traced data directly over the interface 115. The emulator 110 may transmit values of traced signals stored in one or more trace memories 150 to the host system 120, after the emulation is finished or during the emulation. The emulator 110 may also transmit values of traced signals stored in one or more trace memories responsive to receiving a request from the host system 120 or prior to receiving a request from the host system 120. The values of the traced signals transmitted to the host system 120 by the emulator 110 can span one or more time frames, where each time frame includes multiple DUT clock cycles.

For a DUT that is to be emulated, the emulator 110 receives from the host system 120 through the interface 115 one or more binary files including a description of the DUT (e.g., a mapping of a gate level or a hardware description language (HDL) level description of the DUT). The binary files describe partitions of the DUT created by the host system 120 and a mapping of each partition to an FPGA 130. Based on the binary files, the emulator 110 configures each FPGA 130 to emulate the partition of the DUT mapped (assigned) to it and to trace certain signals in its respective partition. The FPGAs 130 collectively emulate the DUT. The values of signals traced by an FPGA 130 during emulation are temporarily stored by the FPGA 130 in its trace memory 150 before being transferred to the host system 120 through the interface 115. These signals as described below are used for generating additional information and/or processing the results of the emulation of the DUT.

The host system 120 configures the emulator 110 to emulate a design under test (DUT). The host system 120 may be a single computer or a collection of multiple computers. In the embodiment where the host system 120 is comprised of multiple computers, the functions described herein as being performed by the host system 120 may be distributed among the multiple computers. The host system 120 may be indirectly connected to the emulator 110 through another device, computer or network.

The host system 120 receives from a user a description of a DUT to be emulated by the emulator 110. In one embodiment, the description of the DUT is in a type of HDL, such as register transfer language (RTL). The host system 120 creates a gate level netlist based on the HDL description of the DUT. The host system 120 uses the HDL or the gate level netlist to partition the DUT into multiple partitions. The host system 120 maps (assigns) each partition to one or more FPGAs 130 included in the emulator 110. Together the FPGAs 130 will emulate the DUT and trace certain signals of the DUT.

The host system 120 creates binary files, which include information to configure the FPGAs 130 based on the DUT and the mappings. A binary file may include, for example, a design description of one or more partitions (e.g., gate level or HDL description), mapping information (e.g., mappings of partitions), connection information (e.g., connections between components of the DUT and/or connections between FPGAs) and design constraints for the DUT.

The host system 120 transmits the binary files to the emulator 110 so that the emulator 110 can configure the FPGAs 130 to emulate their respective mapped partition. The host system 120 instructs the emulator 110 to emulate the DUT. Each FPGA 130 emulates its respective partition and stores values of signals traced during the emulation in its trace memory 150.

Further, the host system 120 receives verification settings indicating values of signals of the DUT that are needed for performing analysis or verification of the DUT. The verification settings may be, for example, a request from a user to trace certain signals of the DUT for debugging or testing the DUT. The verification settings may also include a state machine used for analyzing the performance of the DUT. The verification settings may include a system C model, C/C++ model, program or scripts analyzing design emulation results.

In one embodiment, contents in the trace memory 150 are transmitted to the host system 120 by the emulator 110 through the interface 115, when the FPGAs 130 are not emulating the DUT. In another embodiment, the emulator 110 transmits to the host system 120 through the interface 115 the contents in the trace memory 150 while the FPGAs 130 are emulating the DUT, thereby generating and transmitting a stream of traced information over the interface 115 in parallel with the emulation of the DUT.

The host system 120 receives values of the traced signals from the emulator 110, and performs simulation to obtain a target signal. The target signal is a signal used to verify the performance of the DUT. The target signal can be a signal within the DUT that is traced or not traced by the emulator 110. The target signal also can be a signal not part of the DUT, but indicating a certain condition of the DUT (e.g., a number of toggles, power consumption, an error detection, etc.).

In one aspect, the host system 120 simulates each logic gate based on a state of a reference signal of a logic gate. For example, for a combinatorial circuit (e.g., AND logic gate) receiving two or more inputs, a signal with a fewer number of periodic patterns can be selected as a reference signal. In one approach, duration of the time frame at which the reference signal is in a predetermined state (e.g., 'HIGH' state for AND logic gate) is determined, and an output of the logic gate is obtained based on an input signal of the logic gate for the duration of the time frame, as described below in detail with respect to FIGS. 2B through 2E. Preferably, the host system 120 disregards the input signals for the duration the output signal is not depended on a state of the input signal. Hence, computation resources of the host system 120 may be conserved.

In one aspect, the host system 120 simulates a logic gate based on a periodicity of an input signal detected for the duration at which the reference is in a predetermined state. Specifically, the host system 120 detects a periodic pattern in the waveform (i.e., a collection of values) of the input signal, determines a number of periodic patterns repeated in the waveform of the input signal, and obtains the output signal 245 or an output waveform of the output signal 245 according to the detected periodic pattern and the number of periodic patterns repeated, as described below in detail with respect to FIGS. 2B and 2C.

In one aspect, the host system 120 simulates a logic gate based on events or any transition in a state of a signal. For example, the host system 120 simulates a sequential logic gate (e.g., a flip flop) by searching for an event in a waveform of a data signal and a predetermined edge (herein also referred to as "a clock edge") in a waveform of a clock signal. An event of a signal refers to any change in a state of the signal, and a predetermined edge of a signal herein refers to a transition from a specific state of the signal to another state (e.g., a rising edge or a falling edge). The host system 120 searches for an event in the waveform of a data signal coupled to a data port of the sequential logic gate, searches for a predetermined edge (e.g., rising edge) in the waveform of a clock signal coupled to the clock port of the sequential logic gate after the event in the data signal, and generates the output of the sequential logic gate based on a state of the data signal at a time when the predetermined edge in the clock signal occurred. The host system 120 may maintain the output without a change, when an event of the data signal or when a predetermined edge of the clock signal is not detected.

Figure 2A:
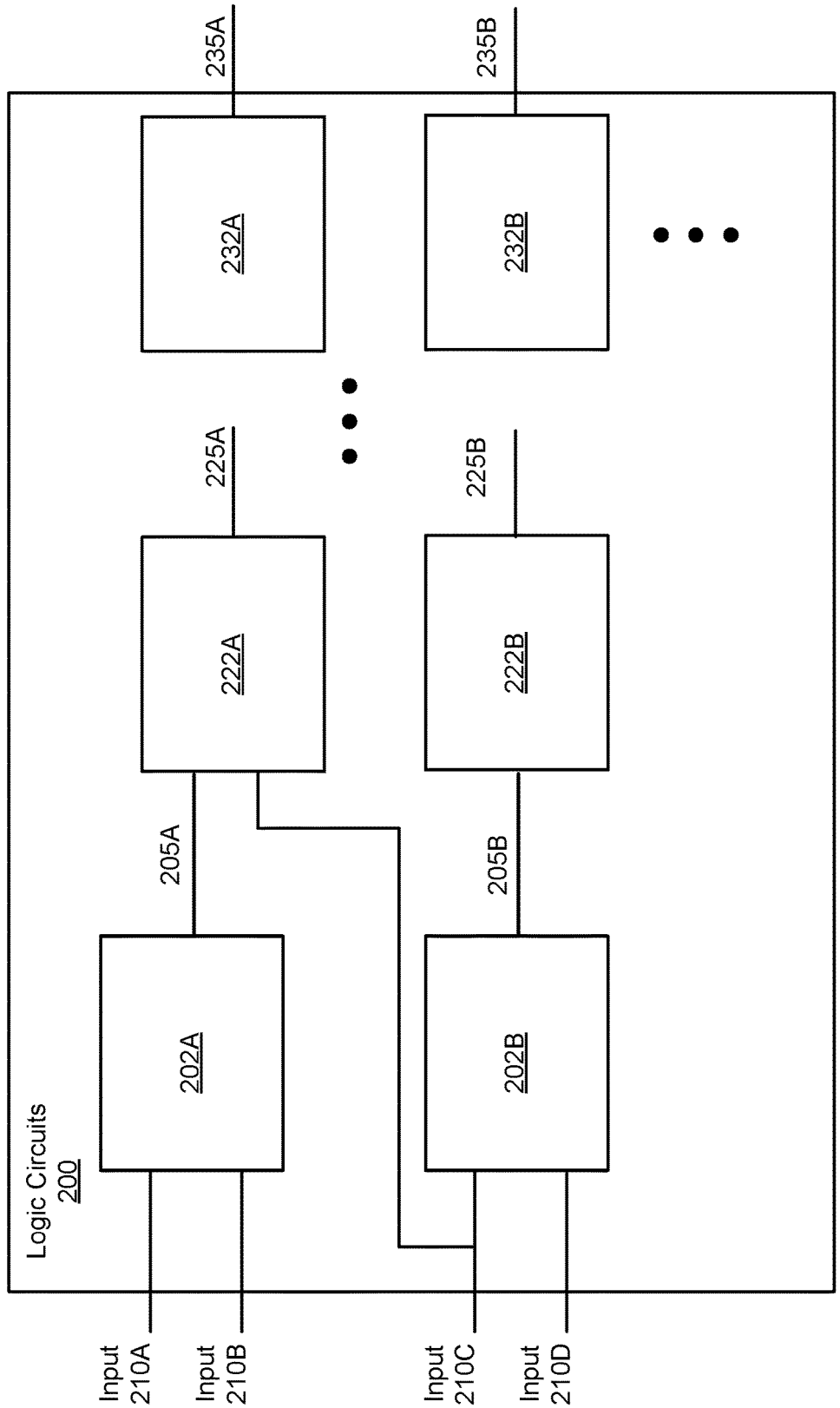
FIG. 2A illustrates example logic gates being simulated, according to one embodiment.

FIG. 2A illustrates example logic gates being simulated, according to one embodiment. The host system 120 obtains waveforms of input signals 210A, 210B, 210C, and 210D for one or more time frames including multiple cycles and simulates the logic circuits 200 (or logic gates 200) to generate waveforms of target signals 235A and 235B for the one or more time frames. The input signals 210A, 210B, 210C, and 210D are signals emulated by the emulator 110 for the one or more time frames or obtained based on emulated signals from the emulator 110 for the one or more time frames. In one aspect, the logic circuits 200 include a portion of the DUT emulated by the emulator 110, additional circuitries that are not portion of the DUT or a combination of both. The target signals 235A and 235B are signals to be analyzed to test the DUT. For example, the target signals 235A and 235B can be outputs of the DUT or signals within the DUT that are traced or not traced by the emulator 110. For another example, the target signals 235A and 235B can be indications of a certain condition of the DUT (e.g., a number of transitions of a certain signal, or a detection of an error condition) for analyzing the behavior of the DUT.

In the example shown in FIG. 2A, the logic gates 200 include multiple logic gates 202A, 202B, 222A, 222B, 232A, and 232B. In this example, the logic gate 202A receives the input signals 210A and 210B, and generates an output signal 205A. The logic gate 202B receives the input signals 210C and 210D, and generates an output signal 205B. The logic gate 222A receives the output signal 205A of the logic gate 202A and the input signal 210C as inputs, and generates an output signal 225A. The logic gate 222B receives the output signal 205B of the logic gate 202B as an input, and generates an output signal 225B. The output signal 225A of the logic gate 222A and the output signal 225B of the logic gate 222B can be propagated in the logic gates 200. The logic gate 232A generates the target signal 235A as its output and the logic gate 232B generates the target signal 235B as its output based on the propagated signals. In other examples, the logic gates can include any number of logic gates or coupled in different configurations.

In one embodiment, the host system 120 simulates a logic gate for a time frame including a plurality of clock cycles before a next logic gate is simulated. In one aspect, a logic gate is simulated per time frame in sequence rather than per clock cycle of the DUT. For example, the logic gate 202B is simulated to obtain a waveform of the output signal 205B for the time frame before the logic gate 222B is simulated, and the logic gate 222B is simulated based on the waveform of the output signal 205B of the logic gate 202B for the time frame to obtain the waveform of the output signal 225B of the logic gate 222B for the time frame.

In one aspect, the logic gate 222B and the logic gate 202B can be simulated simultaneously by different processors. For example, an output waveform of the output signal 205B of the logic gate 202B for the first time frame is obtained. Then, the logic gate 222B is simulated by a processor for the first time frame to obtain the output signal 225B of the logic gate 222B for the first time frame based on the waveform of the output signal 205B of the logic gate 202B for the first time frame. While the processor is simulating the logic gate 222B for the first time frame, the logic gate 202B can be simulated for a second time frame by another processor to obtain an output signal 205B of the logic gate 202B for the second time frame.

In one aspect, the host system 120 simulates the two or more logic gates that are independent from each other in parallel. For example, the host system 120 simulates the logic gate 202A to obtain a waveform of the output signal 205A for a time frame using a processor, and simulates the logic gate 202B to obtain a waveform of the output signal 205B for the same time frame using another processor. By simulating the logic gates in parallel, waveforms of the target signals 235A and 235B can be obtained faster.

In one aspect, the host system 120 simulates each logic gate based on a waveform of a reference signal of a logic gate. The reference signal can be a signal coupled to a predetermined port of a logic gate. In one example, a signal coupled to a control port of a multiplexer (MUX), or a data port of a flip flop (or a latch) can be a reference signal. In another example, the reference signal can be determined to be, from two or more input signals, a signal with a fewer number of periodic patterns. For example, for an 'AND' logic gate (or an 'OR' logic gate), a signal with the least number of periodic patterns in the time frame or in a selected duration is determined as a reference signal.

In one aspect, a reference signal of a logic gate can be dynamically changed for different time frames. For example, for a first time frame, a first signal of two input signals may have a fewer periodic patterns than a second signal and the first signal can be a reference signal for a first time frame. In the same example, for a second time frame, the second signal of the two input signals may have a fewer periodic patterns than the first signal, and the second signal can be a reference signal for the second time frame.

The host system 120 determines duration of a waveform of a reference signal, the duration at which the reference signal is in a predetermined state. Based on the determined duration, the host system 120 can evaluate an input waveform of an input signal for the determined duration, and ignore the input waveform for the other duration at which the reference signal is not in a predetermined state. Hence, computation resources (e.g., a processor capacity and memory capacity) of the host system 120 may be conserved.

In one aspect, the host system 120 simulates one or more logic gates coupled to an input of another logic gate for duration of the time frame. For example, the logic gate 222A receives the input signal 210C as a reference signal, and receives the output signal 205A of the logic gate 202A as an input. In this example, duration at which the input signal 210C is in a predetermined state is determined, and the logic gate 202A may be simulated to obtain the waveform of the output signal 205A for the determined duration based on the waveforms of input signal 210A and the input signal 210B for the determined duration. The simulation of the logic gates 202A for another duration at which the input signal 210C is not in a predetermined state may be omitted, because the output signal 205A of the logic gate 202A for said another duration does not affect the output signal 225A of the logic gate 222A.

Although not shown in this example, the host system 120 can simulate the logic gate with three or more inputs. For example, a two input multiplexer receives two inputs and a control signal. In this case, the control signal can be a reference signal of the multiplexer, and the MUX outputs a first input signal when the reference signal is in a 'HIGH' state, and outputs a second input signal when the reference signal is in a 'LOW' state. The host system 120 may evaluate the first input signal (or one or more logic gates coupled to the first input signal) for a first duration corresponding to a 'HIGH' state of the reference signal based on a periodicity of the first input signal in the first duration. Similarly, the host system 120 may evaluate the second input signal (or one or more logic gates coupled to the second input signal) for a second duration corresponding to a 'LOW' state of the reference signal based on a periodicity of the second input signal in the second duration. Based on the state of the reference signal, the host system 120 may not evaluate for duration, one or more input signals not affecting the output, and one or more logic gates coupled to the one or more input signal, thus conserving computing resources. The host system 120 can simulate any logic gate with any number of inputs in a similar manner.

Figure 2B:
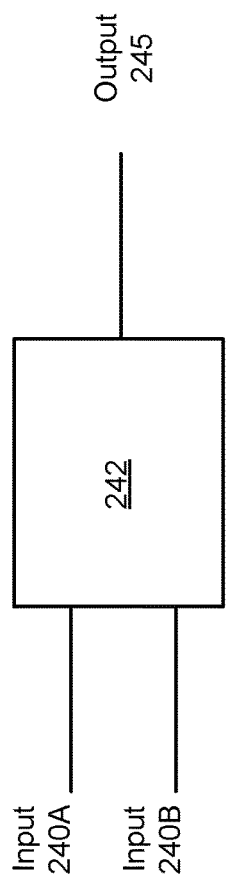
FIG. 2B illustrates an example logic gate being simulated, according to one embodiment.

FIG. 2B illustrates an example logic gate being simulated, according to one embodiment. In FIG. 2B, the logic gate 242 receives input signals 240A and 240B and generates an output signal 245. The logic gate 242 can be a logic gate 222A of FIG. 2A, a logic gate 202A of FIG. 2A, or any logic gate. The host system 120 simulates the logic gate 242 for a time frame including a plurality of clock cycles of the DUT by determining duration at which a reference signal of the logic gate is in a predetermined state, and by selectively analyzing waveforms of the input signals for duration the output signal depends on the input signal.

Figure 2C:
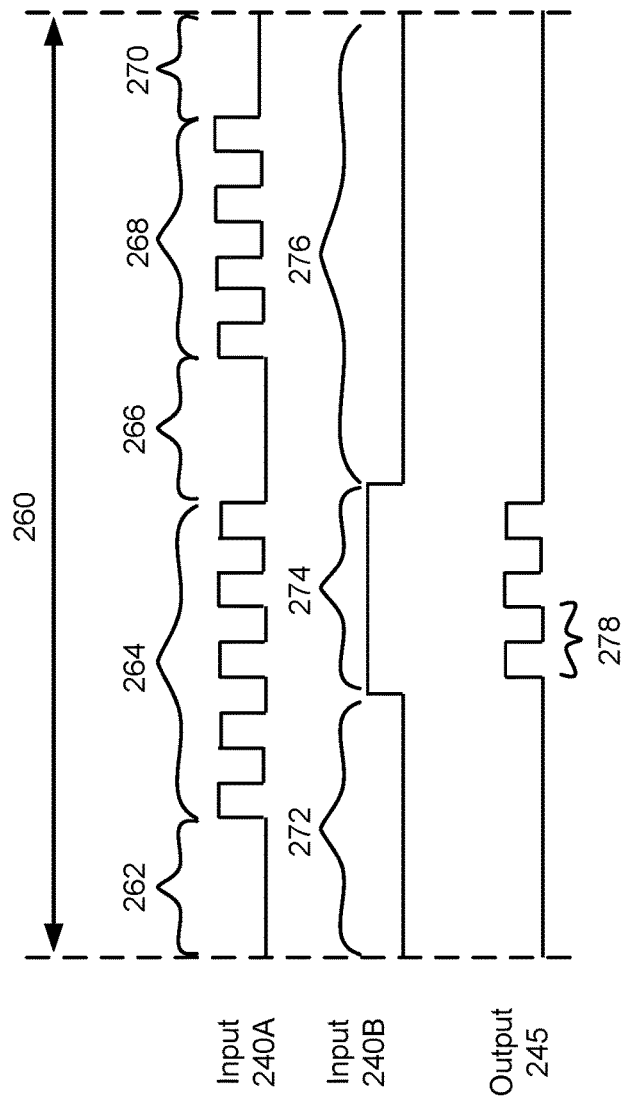
FIG. 2C illustrates an example timing diagram of the logic gate of FIG. 2B, according to one embodiment.

Assume, for example, the logic gate 242 is an 'AND' gate with waveforms of the input signals 240A and 240B shown in FIG. 2C. Within a time frame 260, the input signal 240A has a 'LOW' state for duration 262, includes five pulses for duration 264, has a 'LOW' state for duration 266, includes four pulses for duration 268, and has a 'LOW' state for duration 270. The input signal 240B has a 'LOW' state for duration 272, a 'HIGH' state for duration 274, and a 'LOW' state for the duration 276. In this example, the input signal 240B has a fewer periodic patterns than the input signal 240A. Thus, the host system 120 selects the input signal 240B as a reference signal, and determines when the input signal 240B is in a predetermined state (e.g., 'HIGH' state).

The host system 120 generates the waveform of the output signal 245 based on the waveform of the input signal 240A for the duration 274 at which the reference signal is in a predetermined state (e.g., 'HIGH' state), and generates the waveform of the output signal 245 in a default state for the durations 272 and 276 at which the reference signal is in a non-predetermined state (e.g., 'LOW' state). For example, the host system 120 generates the waveform of the output signal 245 having a 'LOW' state for the duration 272, because the input signal 240A does not affect the output signal 245 for the duration 272. The host system 120 generates the waveform of the output signal 245 including three pulses for the duration 274, because three pulses are detected in the input signal 240A when the input signal 240B in a 'HIGH' state for the duration 274. The host system 120 generates the waveform of the output signal 245 for the duration 276 having a 'LOW' state, for the similar reason for the duration 272.

In one aspect, the host system 120 simulates the logic gate 242 based on a periodicity in a waveform of an input signal detected when the reference signal is in a predetermined state. For example, the host system 120 detects three pulses occurred in the waveform of the input signal 240A for the duration 274. The host system 120 determines attributes of the periodic pattern (e.g., period, pulse width, a start time of the pattern) and determines there are three pulses in the waveform of the input signal 240A in the duration 274. Accordingly, the host system 120 generates three pulses for the waveform of the output signal 245 in the duration 274, for example by replicating the three pulses of the input signal 240A in the duration 274 based on the determined attributes of the periodic pattern. For a different logic gate, the output waveform can be generated by taking an inverse of a periodic pattern of the input signal in a duration at which the reference signal is in a predetermined state and replicating the inverse of the periodic pattern in the duration. Although there are three pulses included in the waveform of the input signal 240A in the duration 274 in this example, there may be thousands or more repeated patterns, and the host system 120 simply detects the pattern and the number of patterns occurred in the input waveform, and generates the output waveform based on the detected pattern and the number of patterns occurred rather than analyzing the logic gate for each DUT clock cycle 278. Accordingly, the host system 120 can obtain the output for the time frame in a short amount of time.

Figure 2D:
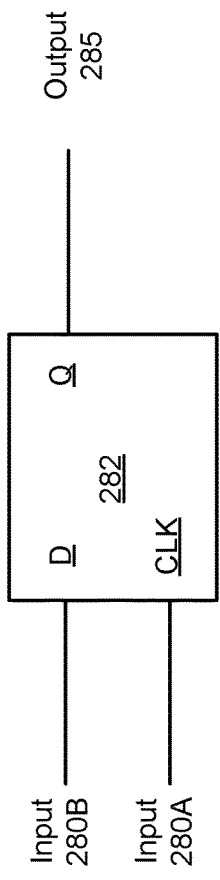
FIG. 2D illustrates an example logic gate being simulated, according to one embodiment.
Figure 2E:
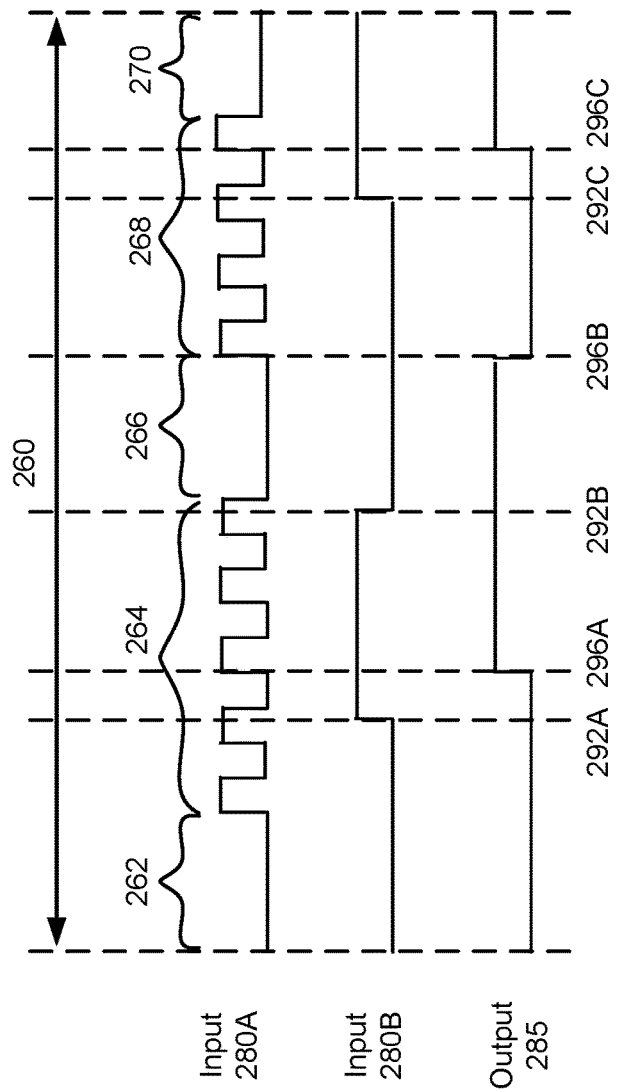
FIG. 2E illustrates an example timing diagram of the logic gate of FIG. 2D, according to one embodiment.

FIG. 2D illustrates an example logic gate being simulated, according to one embodiment. In FIG. 2D, the logic gate 242 receives input signals 280A and 280B and generates an output signal 285. The logic gate 282 can be a logic gate 222A of FIG. 2A, a logic gate 202A of FIG. 2A, or any logic gate.

Assume, for example, the logic gate 282 is a flip flop that receives the input signal 280B at a data port D of the flip flop, and the input signal 280A at a clock port CLK of the flip flop. The waveform of the input signal 280A is the same as the waveform of the input signal 240A of FIG. 2C for simplicity. The input signal 280B has a rising edge at a time 292A, a falling edge at a time 292B, and a rising edge at a time 292C. In this example, the input signal 280B coupled to the data port D is determined as a reference signal of the flip flop. An event of the reference signal (e.g., input signal 280B) of the flip flop is a change in any state of the reference signal of the flip flop. In this example, events of the input signal 280B occur at times 292A, 292B, and 292C.

In one aspect, the host system 120 searches for an event in an input waveform of the reference signal (e.g., the input signal 280B) and a predetermined edge (herein also referred to as "a clock edge") in another input waveform of the clock signal (e.g., the input signal 280A) after the event in the input waveform, then generates an output waveform of the output signal 285 according to a state of the reference signal (e.g., the input signal 280B) at a time when the clock edge occurred. If an event is not detected in the reference signal or a clock edge is not occurred in the clock signal, the output will be maintained in a previous state.

For example, the host system 120 searches for an event of the reference signal (e.g., input signal 280B) occurred at the time 292A. The host system 120 searches for a predetermined edge (e.g., a rising edge) of the clock signal (e.g., input signal 280A) at the time 296A, then the host system 120 generates the output waveform of the output signal 285 to have a 'LOW' state until the time 296A, and to have a 'HIGH' state starting from the time 296A, because the reference signal (e.g., input signal 280B) is in the 'HIGH' state at the time 296A. The host system 120 searches for another event of the reference signal occurred at the time 292B, and then searches for the next predetermined edge of the clock signal at the time 296B. The host system 120 generates the output waveform of the output signal 285 to have a 'HIGH' state between the times 296A and 296B, and to have a 'LOW' state starting from the time 296B, because the reference signal is in the 'LOW' state at the time 296B. Similarly, the host system 120 searches for another event of the reference signal occurred at the time 292C, then searches the next predetermined edge of the clock signal at the time 296C. The host system 120 generates the output waveform of the output signal 285 to have a 'LOW' state between the times 296B and 296C, and to have a 'HIGH' state starting from the time 296C, because the reference signal is in the 'HIGH' state at the time 296C. The host system 120 repeats the process until the output waveform for the time frame 260 is obtained.

Figure 3:
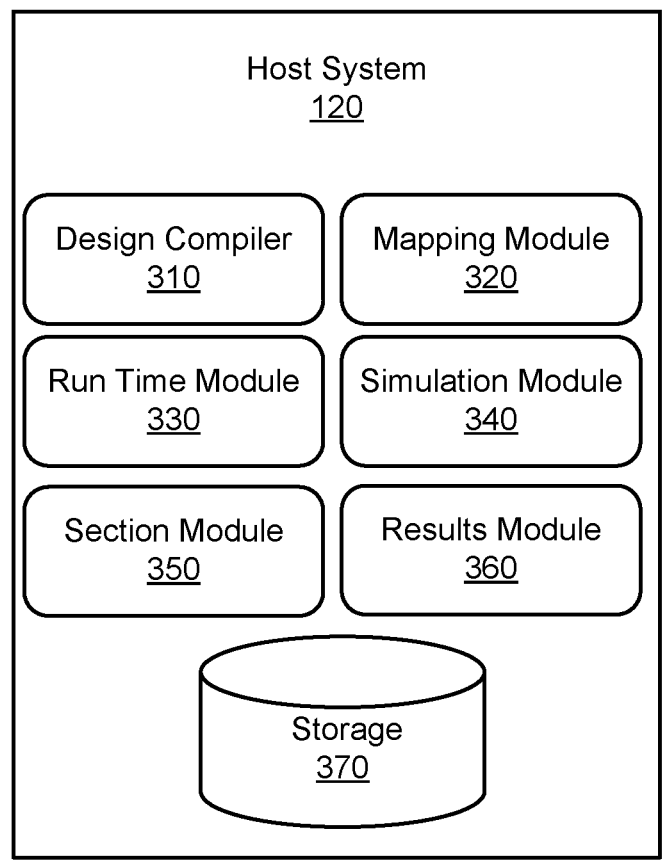
FIG. 3 is a block diagram of the host system, according to one embodiment.

FIG. 3 is a block diagram illustrating the host system 120 in more detail, according to one embodiment. The host system 120 includes a design compiler 310, mapping module 320, run time module 330, simulation module 340, section module 350, results module 360 and storage 370. Each of these components may be embodied as hardware, software, firmware, or a combination thereof. Additional configuration information for the host system 120 is illustrated in detail with respect to FIG. 7.

The design compiler 310 converts HDL of DUTs into gate level logic. For a DUT that is to be emulated, the design compiler 310 receives a description of the DUT in HDL (e.g., RTL or other level of abstraction). The design compiler 310 synthesizes the HDL of the DUT to create a gate level netlist with a description of the DUT in terms of gate level logic.

In one embodiment, the design compiler 310 identifies signals of the DUT to be traced by the emulator 110 during emulation of the DUT. In one embodiment, the identified signals do not include all signals in the DUT or all states of the DUT. In one embodiment, information is received from a user or from another system indicating the signals of the DUT that should be traced.

The mapping module 320 maps DUTs to FPGAs 130 of the emulator 110. After the design compiler 310 creates a gate level netlist, the mapping module 320 partitions the DUT at the gate level into a number of partitions using the netlist. In one embodiment, the mapping module 320 partitions the DUT by identifying one or more partitions of the DUT to be emulated based on signals needed to perform analysis of the DUT. The mapping module 320 maps each partition to a corresponding FPGA of the emulator 110. In one approach, the mapping module 320 performs the partitioning and mapping using one or more of the following: design rules, design constraints (e.g., timing or logic constraints), available resources in FPGA 130, limitations on trace memories 150, gates resulting from the HDL, HDL source code, user inputs, and information about the emulator 110.

The mapping module 320 generates one or more binary files to configure the FPGAs 130 to emulate their respective partition. In one embodiment, the mapping module 320 generates a binary file for each FPGA 130. The mapping module 320 stores the binary files in the storage 370. The mapping module 320 also stores signal information in the storage 370 indicating which signals are traced by each FPGA 130 based on the mappings.

The run time module 330 configures the emulator 110 for performing the emulation of a DUT. The run time module 330 transmits to the emulator 110 via interface 115 binary files stored in the storage 370 for the DUT to configure the FPGAs 130 of the emulator 110 to emulate the DUT. The run time module 330 instructs the emulator 110 to emulate the DUT. In one embodiment, prior to the start of the emulation or during the emulation of the DUT, the run time module 330 transmits to the emulator 110 input parameters and/or state machines to configure and control the emulation of the DUT.

The section module 350 generates one or more sections including representations of circuitries to be simulated. In one aspect, a section includes a representation of a portion of the DUT, a representation of additional circuitries that are not part of the DUT or a combination of both. Additional circuitries can be included, for example, for performing power analysis or error checking. One or more sections are stored in the storage 370 and can be retrieved later to perform simulation.

The simulation module 340 simulates section of DUTs. The simulation module 340 can simulate any type of section. The section simulated by the simulation module 340 includes combinatorial, sequential, or a combination of both types of circuits. The simulation module 340 simulates one or more sections to obtain a target signal to analyze the behavior of the DUT.

The simulation module 340 identifies the values of signals of the DUT that need to be obtained. From the signal information stored in the storage 370, the simulation module 340 identifies which sections of the DUT when be simulated produce one or more of the identified signals. The simulation module 340 further determines which signals are needed to simulate the identified sections. The simulation module 340 identifies the needed signals that have been traced by the emulator 110. If the needed signals have not yet been obtained from the emulator 110, the simulation module 340 requests and receives the signals from the emulator 110. In one embodiment, if a signal needed to simulate an identified section is not traced by the emulator 110, the simulation module 340 simulates one or more sections to obtain the needed signal.

The simulation module 340 simulates each of the identified sections using values (or waveforms) of the signals obtained (e.g., from the emulator 110 or by simulating other sections). The simulation module 340 may also simulate sections using provided input parameters (e.g., from a user). The simulation module 340 stores values of the signals traced during the simulations of the sections in the storage 370. In one embodiment, the simulation module 340 also retrieves from the emulator 110 values of signals identified in the verification settings that have already been traced by the emulator 110 when emulating the DUT. The simulation module 340 stores values of the traced signals retrieved from the emulator 110 in the storage 370.

The simulation module 340 obtains waveforms of input signals for a time frame including a plurality of clock cycles and simulates logic gates in the sections for the time frame to obtain a waveform of a target signal for the time frame. In one aspect, the simulation module 340 simulates two or more logic gates per time frame in sequence rather than per clock cycle of the DUT. In another aspect, the simulation module 340 simulates two or more logic gates that are independent from each other in parallel. In one aspect, the simulation module 340 simulates a logic gate for a time frame by selectively analyzing a waveform of an input of a logic gate for duration at which an output of the logic gate depends on the input, and by disregarding the input of the logic gate for another duration at which the output of the logic gate does not depend on the input. In one aspect, the simulation module 340 simulates one or more logic gates coupled to the input of the logic gate for the duration at which an output of the logic gate depends on the input, and omits simulations of the one or more logic gates for another duration at which the output of the logic gate does not depend on the input.

In one embodiment, the simulation module 340 determines a reference signal of a logic gate. The reference signal can be a signal coupled to a predetermined port of a logic gate. Alternatively, the simulation module 340 determines from two or more input signals of a logic gate, a signal with a fewer number of periodic patterns as a reference signal of the logic gate. In one aspect, a reference signal of a logic gate for different time frames can be dynamically changed. For example, a first signal of two input signals may have a fewer number of periodic patterns than a second signal of the two input signals in a first time frame, and the first signal can be a reference signal for the first time frame. Similarly, the second signal of the two input signals may have a fewer number of periodic patterns than the first signal, and the second signal can be a reference signal for the second time frame.

For a combinatorial logic gate, the simulation module 340 detects a reference signal in a first state (e.g., a predetermined state) for a first duration of the time frame, and in a second state (e.g., a non-predetermined state) for a second duration of the time frame, then generates the waveform of the output signal 285 based on the waveform of the input signal in the first duration. The simulation module 340 may ignore the waveform of the input signal in the second duration. The simulation module 340 generates the waveform of the output in a default state in the second duration or according to a waveform of another input signal in the second duration. The simulation module 340 detects a periodic pattern in the waveform of the input signal, and determines a number of periodic patterns repeated in the waveform of the input signal. In one approach, the simulation module 340 obtains the output of a logic gate according to the detected periodic pattern and the number of periodic patterns repeated as described above with respect to FIGS. 2B and 2C.

For a sequential logic gate (e.g., flip flop), the simulation module 340 detects an event of a reference signal coupled to a data port of the flip flop and a clock edge of a clock signal coupled to a clock port of the flip flop, and generates the output according to a state of the reference signal at a time when the clock edge occurs after the event of the reference signal, as described above with respect to FIGS. 2D and 2E. The simulation module 340 maintains the output until a next event in the reference signal and a next clock edge in the clock signal after the next event are detected.

The simulation module 340 is invoked and retrieves the traced signals according to the status of the interface 115. In one embodiment, the interface 115 between the emulator 110 and the host system 120 is enabled during the emulation of the DUT. The simulation module 340 retrieves values of the signals traced by the emulator 110 during the emulation of the DUT performed by the emulator 110. The simulation module 340 also simulates the identified section during the emulation of the DUT.

In one embodiment, the emulator 110 stores all or some of the traced values (or waveforms) in the storage 370 while the interface 115 is enabled. Regardless of the DUT being emulated or not, the simulation module 340 can retrieve the values of the signals stored by the emulator 110 in the storage 370 and simulate some sections of the DUT in order to provide signal values that were not stored already. The simulation module 340 can then store the simulated signal values into the storage 370, or provide those values on a GUI interface, or to a script or software program running on the host system 120, which may have requested some of those values.

In one embodiment, the interface 115 between the host system 120 and the emulator 110 is disabled during emulation and enabled after the emulation is complete. The simulation is performed after the host system 120 completes emulation of the DUT or a portion of the DUT. When the emulation is complete, the simulation module 340 can retrieve signals traced during the emulation via the interface 115, and simulate the identified sections.

In one embodiment, the simulation module 340 is invoked and retrieves the traced signals in an interactive mode. In the interactive mode, the simulation module 340 is invoked by a user monitoring a signal or a small set of signals at a time. The user requests or selects a desired signal, typically in a GUI interface like Verdi$^3$™ waveform viewer from Synopsys, Inc., Virtuoso® waveform viewer from Cadence Design Systems, Inc., or EZwave™ waveform viewer from Mentor Graphics, Inc. The simulation module 340 obtains additional signal values through simulation based on the monitored signals. The simulation may be performed locally on a system (e.g., host system 120) used to run Verdi.

In one embodiment, the simulation module 340 is invoked and retrieves the traced signals in a non-interactive mode. The simulation module 340 may operate without a user request, but instead may operate based on scripts provided prior to the emulation. The non-interactive mode may be employed when the set of signals is large, up to the full design.

The results module 360 provides results from emulating a DUT and simulating sections of the DUT. The results module 360 processes values of the traced signals produced by the simulations of DUT sections and values of the traced signals retrieved from the emulator 110. In one embodiment, the results module 360 retrieves values of the traced signals from the storage 370 and generates a user interface for display to a user that includes representations of values of the traced signals. In one embodiment, the results module 360 is a waveform viewer that generates waveforms of traced signals for display. In one embodiment, the results module 360 includes an API to create a visual waveform of traced signals for display to a user. Processing the traced signals may also include the results module 360 counting events based on the traced signals. In another embodiment, the results module 360 includes a binary program (obtained from a system C model, C/C++ model or any other software language) or a script processing the signal values to produce information based on the signal values or a display of that information.

In one embodiment, one or more functions of the host system 120 may be performed at another computer (e.g., a collection of dedicated computers or machines). For example, the design compiler 310 and the mapping module 320 may be included in another computer for compiling and partitioning a DUT.

Figure 4:
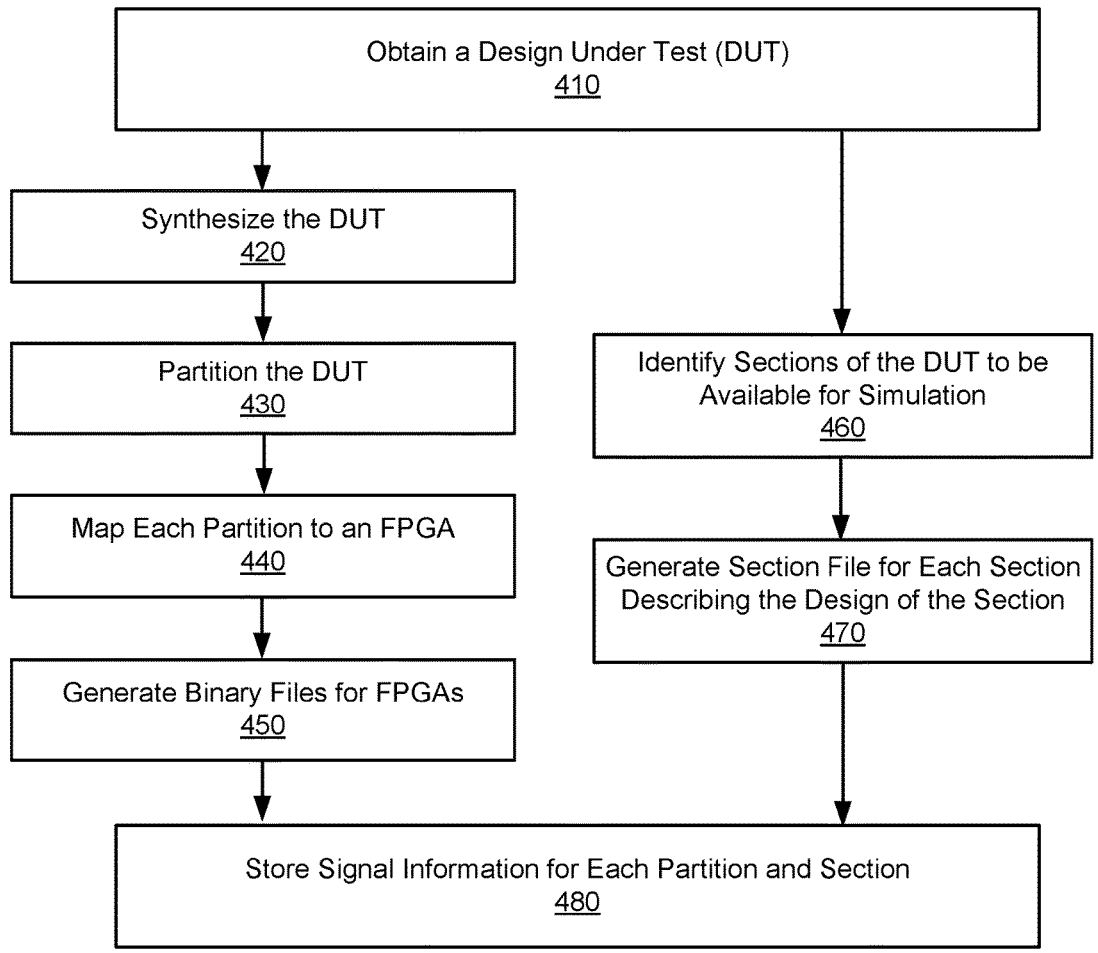
FIG. 4 is a flow chart illustrating the host system preparing for the emulation of the DUT, according to one embodiment.

FIG. 4 is a flow chart illustrating the host system 120 preparing for the emulation of a DUT, according to one example embodiment. Other embodiments can perform the steps of FIG. 4 in different orders. Moreover, other embodiments can include different and/or additional steps than the ones described here.

The host system 120 obtains 410 from a user a description of a DUT in HDL. Based on the description of the DUT, the host system 120 generates configuration files for emulating the DUT in the emulator 110 and for simulating sections in the host system 120. Preferably, the host system 120 generates binary files to be loaded in the FPGAs 130 of the emulator 110 and section files to be used by the host system 120 when needed to simulate one or more section. In one embodiment, the host system 120 generates the binary files and section files in parallel.

For generating binary files, the host system 120 synthesizes 420 the HDL description of the DUT to create a gate level netlist. In one embodiment, the host system 120 also obtains a predetermined list of signals of the DUT that should be traceable during the emulation.

The host system 120 partitions 430 the DUT at the gate level into a number of partitions using the gate level netlist. In one embodiment, the host system 120 partitions the DUT by identifying one or more partitions of the DUT to be emulated based on available sections and/or signals needed to perform analysis of the DUT. The host system 120 maps 440 each partition to a FPGA 130 of the emulator 110. The host system 120 generates 450 binary files that include information to configure the FPGAs 130 to emulate their respective mapped partition of the DUT.

For generating section files, the host system 120 identifies 460 sections of the DUT that are to be available for simulation. After identifying sections of the DUT, the host system 120 generates 470 a section file for each section describing the design of the section. The host system 120 stores the section files. Identifying sections of the DUT may be based on at least any one of synthesizing, partition, and mapping of the DUT for steps 420, 430, and 440 respectively. A list of signals in the identified sections of the DUT may be used for at least any one of synthesizing, partitioning, mapping, and generating binary files of the DUT for steps 420, 430, 440, and 450 respectively.

After generating both the binary files for the FPGAs 130 and section files for the simulation module 340, the host system 120 stores 480 signal information for each partition indicating which signals are traced when the partition is emulated. The host system 120 also stores signal information for each section indicating which signals are traced when the section is simulated and information indicating which input signals are needed to simulate the section. The storing 480 can be done in one or many data-bases, files, hard disks, memories, or external storing devices.

Figure 5:
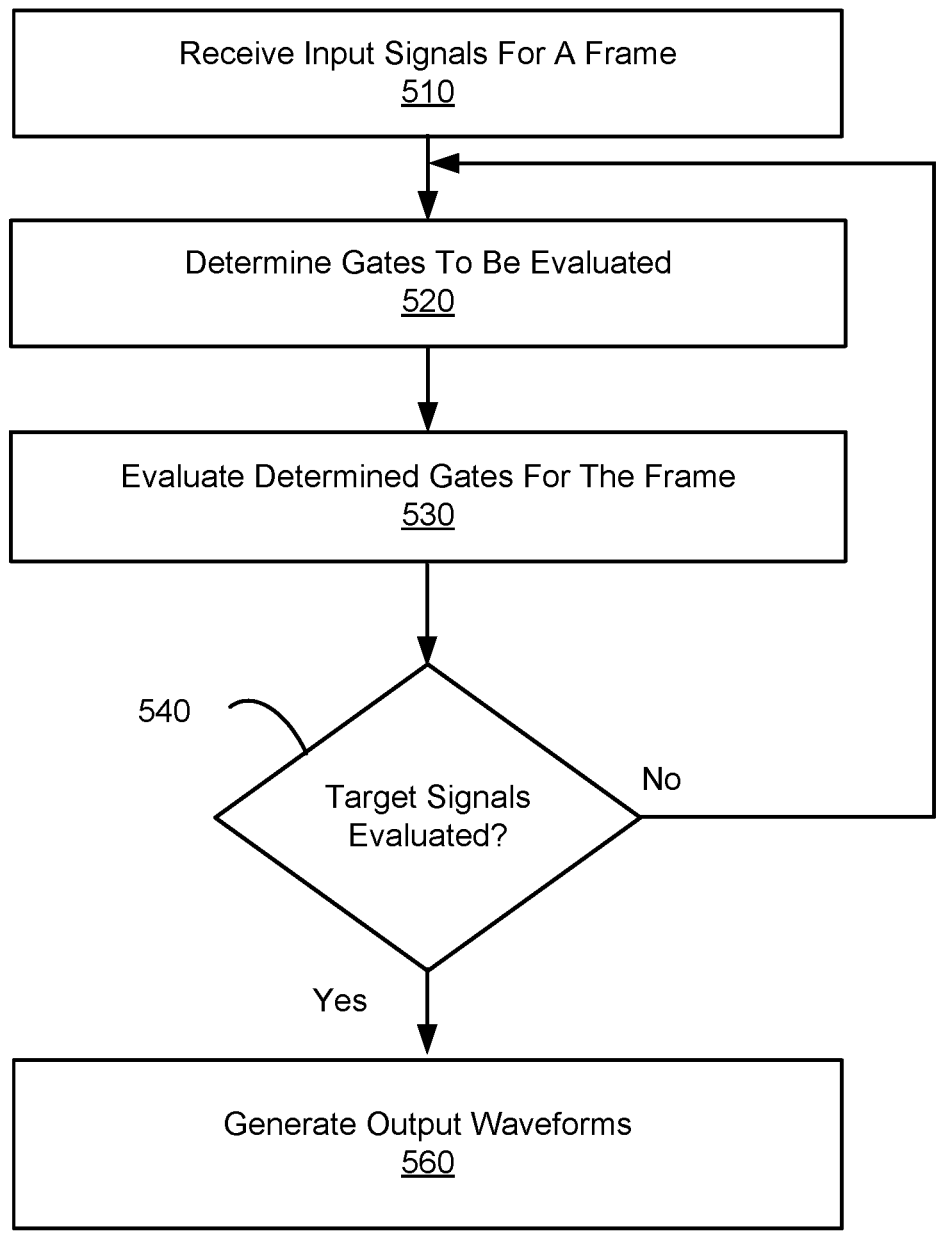
FIG. 5 is a flow chart of the host system simulating logic gates based on the emulation of the DUT, according to one embodiment.

FIG. 5 is a flow chart of the host system simulating logic gates based on the emulation of the DUT, according to one embodiment. Other embodiments can perform the steps of FIG. 5 in different orders. Moreover, other embodiments can include different and/or additional steps than the ones described here.

The host system 120 receives 510 waveforms of input signals of logic gates for a time frame. The host system 120 determines 520 logic gates to be evaluated. In one example, the logic gates can be determined to obtain a waveform of a target signal requested. In one example, a logic gate with at least one input signal with a full waveform obtained for the time frame will be determined to be evaluated. In one aspect, the host system 120 determines a waveform of an input of a logic gate for a first duration is needed to obtain a waveform of an output of the logic gate and simulates one or more logic gates coupled to the input of the logic gate for the first duration. The host system 120 determines the input of the logic gate for a second duration is not needed to determine the output of the logic gate, and omits simulation of the one or more logic gates coupled to the input for the second duration. The first duration and the second duration can be determined based on a state of a reference signal of the logic gate. The determined logic gates can be evaluated 530 to obtain waveforms of outputs of the determined gates for the time frame, as described with respect to FIG. 6A or FIG. 6B.

The host system 120 determines 540 whether target signals are analyzed for the time frame or not (or whether waveforms of the target signals are obtained or not). If the target signals are not analyzed for the time frame, the host system 120 determines other gates (e.g., subsequent gates) to be evaluated for the time frame. For example in FIG. 2A, after obtaining a waveform of the output signal 205B of the logic gate 202B for the time frame, the host system 120 determines to simulate the logic gate 222B to obtain the waveform of the output signal 225B. The process is repeated until the waveforms of target signals 235A and 235B for the time frame is obtained. Responsive to determining that the target signals are evaluated for the time frame, the host system 120 generates 560, for presentation to a user, the waveforms of the target signals for the time frame. The host system 120 also stores the waveforms of the target signals in the storage.

Figure 6A:
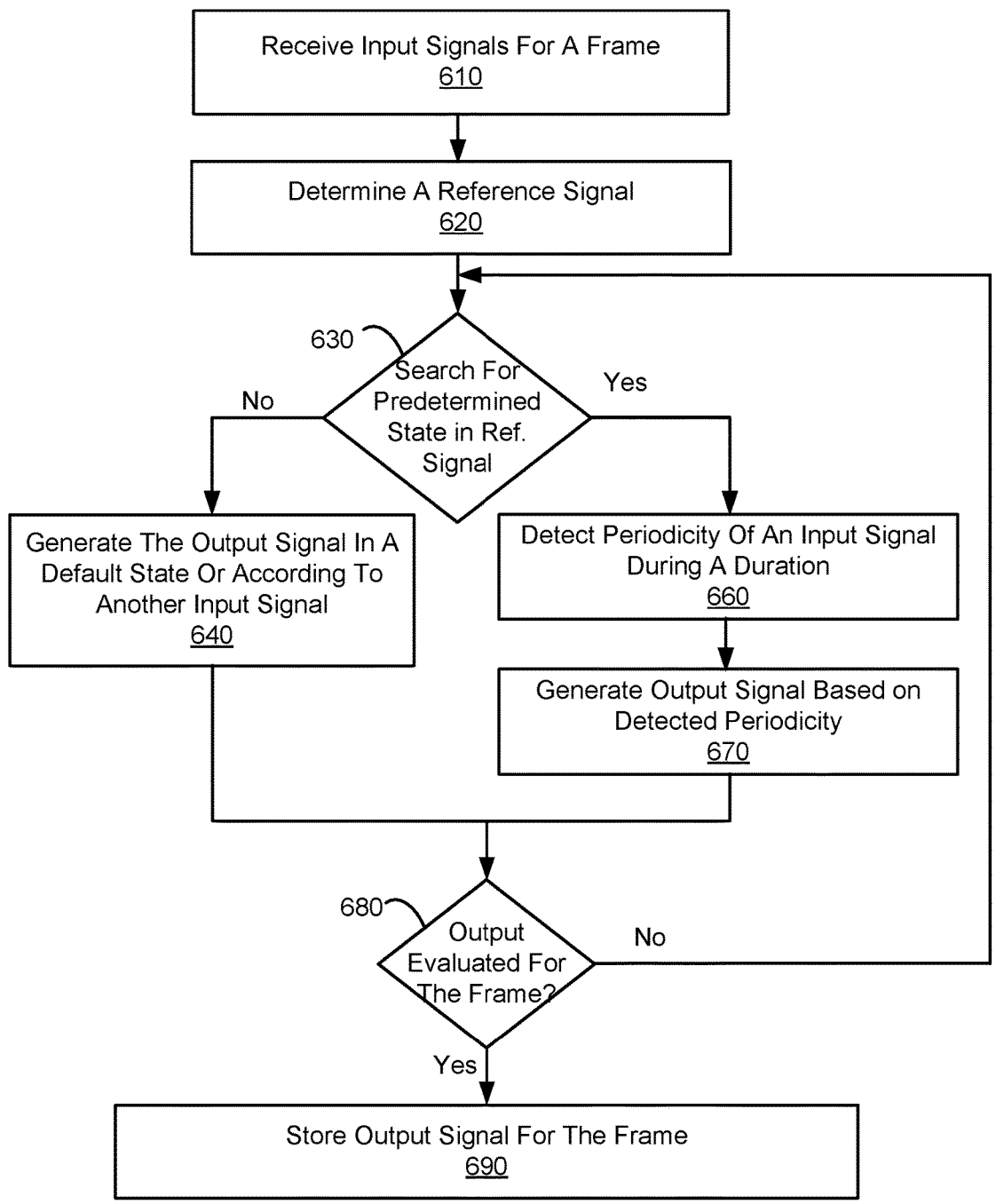
FIG. 6A is a flow chart of the host system simulating a non-sequential logic gate, according to one embodiment.

FIG. 6A is a flow chart of the host system 120 simulating a non-sequential logic gate, according to one embodiment. Other embodiments can perform the steps of FIG. 6A in different orders. Moreover, other embodiments can include different and/or additional steps than the ones described here.

The host system 120 receives 610 waveforms of input signals of a logic gate for a time frame (or a portion of the time frame). The host system 120 determines 620 which signal is a reference signal of the logic gate. For example, a signal coupled to a control port of a multiplexer (MUX) can be a reference signal. If the logic gate is a combinatorial circuit (e.g., 'AND', 'OR', 'NAND', 'NOR', 'XOR', 'XNOR' logic gate), the reference signal can be determined, from two or more input signals, a signal with a fewer number of periodic patterns in the time frame.

Based on the reference signal, the host system 120 searches 630 for a predetermined state of the reference signal in the waveform of the reference signal. For duration at which the reference signal is in the predetermined state, the host system 120 detects 660 a periodicity in a waveform of an input signal for the duration, and generates 670 an output waveform of the output signal for the duration based on the detected periodicity. Specifically, the output waveform of the output of the logic gate is determined based on a detected periodic pattern and a number of periodic patterns repeated in the duration.

For duration at which the reference signal is in a non-predetermined state, the host system 120 generates 640 the output waveform of the output signal in a default state for the duration. Alternatively, for the duration at which the reference signal is in the non-predetermined state, the host system 120 generates the output waveform of the output signal according to a state of another input signal or a periodicity of said another input signal for the duration.

The host system 120 determines 680 whether the output of the logic gate is evaluated for the time frame (or whether the output waveform of the output of the logic gate for the time frame is obtained). If the output of the logic gate is not evaluated for the time frame, the host system 120 searches 630 for a next duration in the waveform of the reference signal, the next duration at which the reference signal is in the predetermined state, and repeats the process until the output is evaluated for the time frame. If the output is evaluated for the time frame, the host system 120 stores 690 the output waveform of the output signal for the time frame.

Figure 6B:
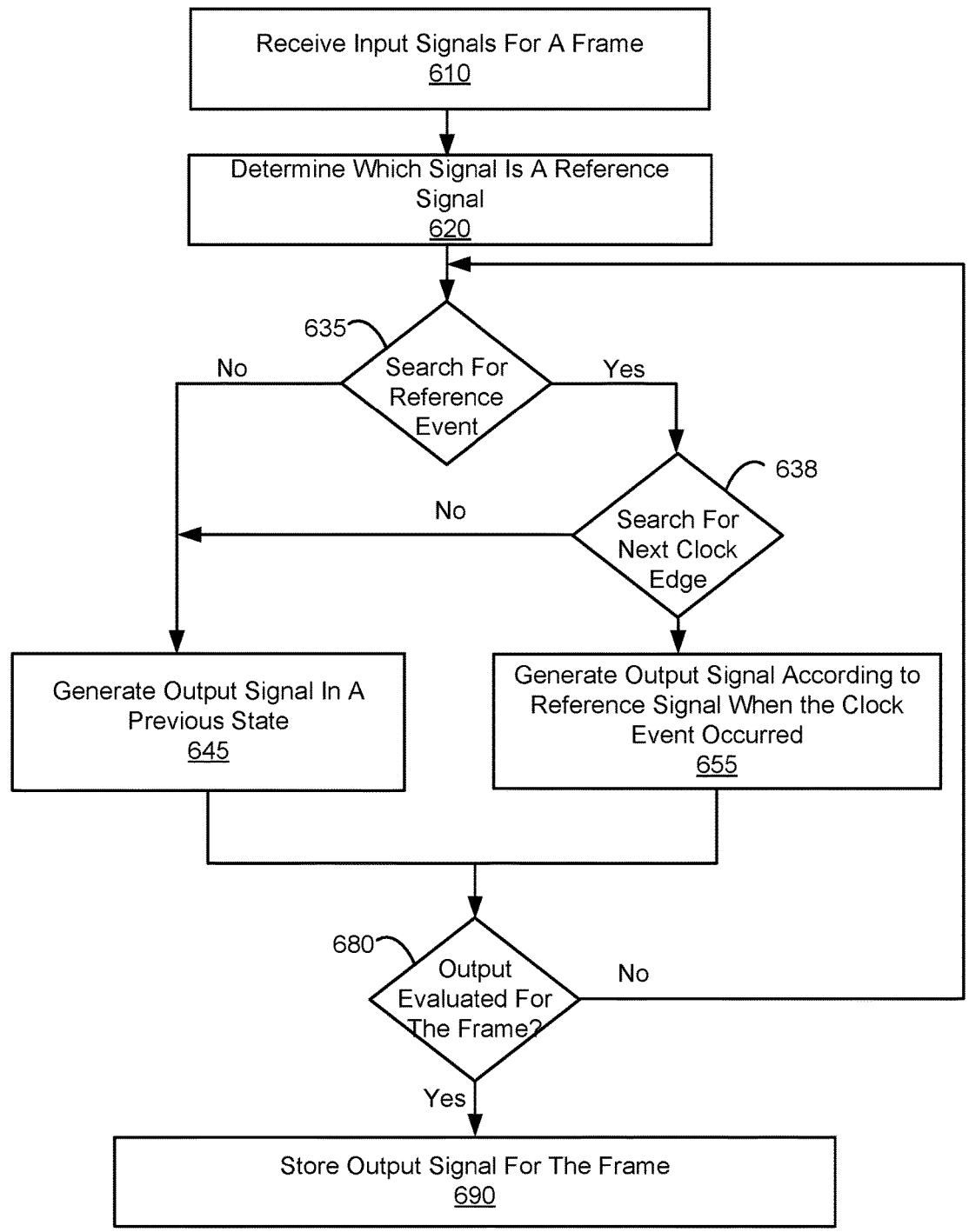
FIG. 6B is a flow chart of the host system simulating a sequential logic gate, according to one embodiment.

FIG. 6B is a flow chart of the host system 120 simulating a sequential logic gate, according to one embodiment. Other embodiments can perform the steps of FIG. 6B in different orders. Moreover, other embodiments can include different and/or additional steps than the ones described here.

The host system 120 receives 610 waveforms of input signals of a logic gate for a time frame (or a portion of the time frame). The host system 120 determines 620 which signal is a reference signal of the logic gate. For example, a signal coupled to a data port of a flip flop can be a reference signal, and a signal coupled to a clock port of the flip flop can be a clock signal.

Based on the reference signal, the host system 120 searches 635 for an event of the reference signal in a waveform of the reference signal. For a flip flop, an event of the reference signal (herein also referred to as "a reference event") is any change in a state of the reference signal. If no event is detected in the waveform of the reference signal, the host system 120 generates 645 an output waveform of an output signal of the flip flop in a previous state of the output signal. If the host system 120 detects an event of the reference signal, the host system 120, in a waveform of the clock signal, searches 638 for a clock edge of a clock signal occurred after the event of the reference signal. Responsive to detecting the clock edge in the waveform of the clock signal, the host system 120 generates 655 the waveform of the output signal of the flip flop according to a state of the reference signal at a time when the clock edge of the clock signal is detected. Responsive to not detecting the clock edge in the waveform of the clock signal, the host system 120 proceeds to the step 645 and generates the output waveform of the output signal in a previous state.

The host system 120 determines 680 whether the output of the logic gate is evaluated for the time frame (or whether the output waveform of the output of the logic gate for the time frame is obtained). If the output of the logic gate is not evaluated for the time frame, the host system 120 searches 635 for the next event of the reference signal and repeats the process until the output is evaluated for the time frame. If the output is evaluated for the time frame, the host system 120 stores 690 the output waveform of the output signal for the time frame.

Computing Machine Architecture

Figure 7:
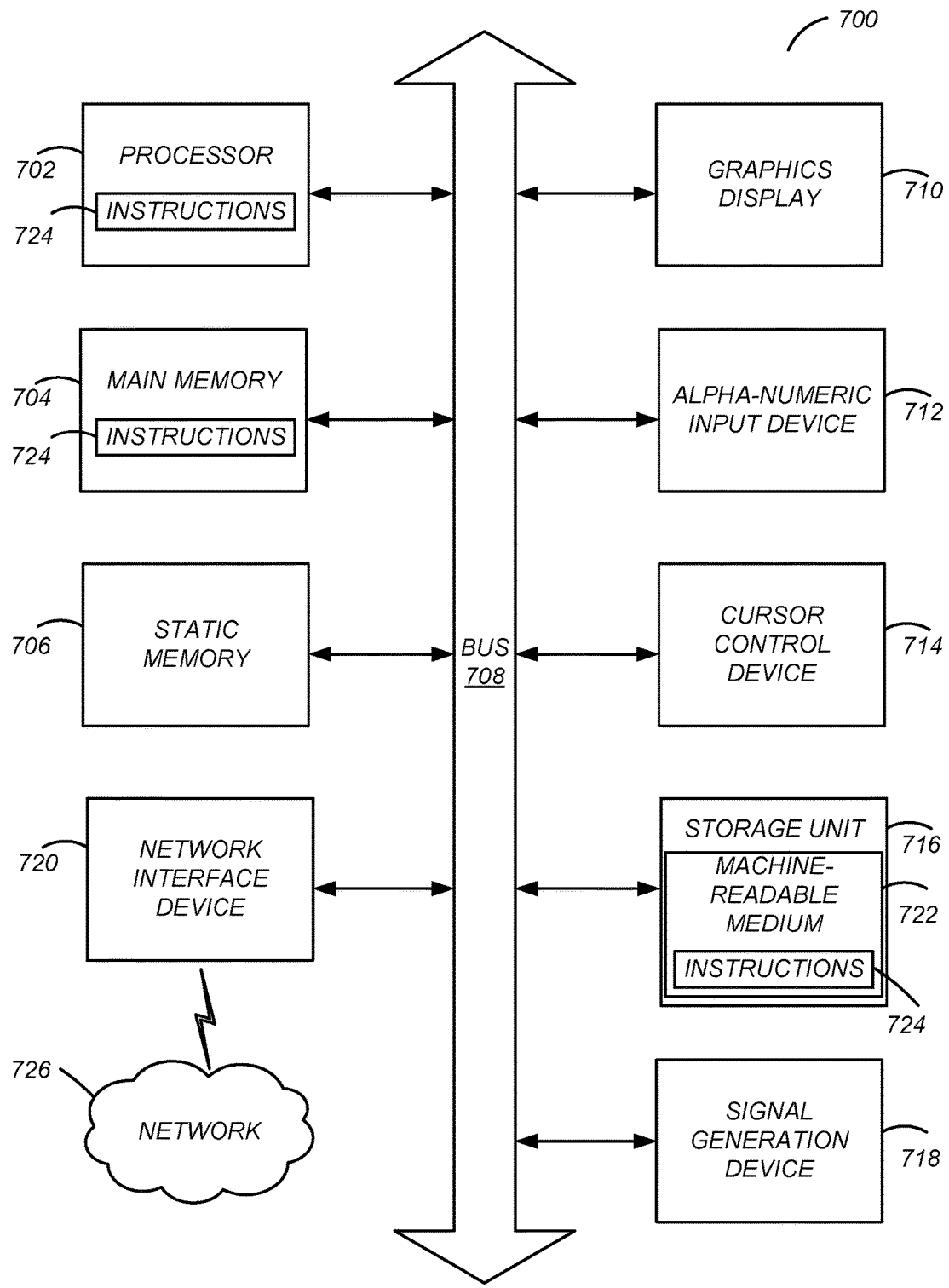
FIG. 7 illustrates one embodiment of components of an example machine able to read instructions from a machine-readable medium and execute them in a processor (or controller).

Turning now to FIG. 7, it is a block diagram illustrating components of an example machine able to read instructions from a non-transitory machine-readable medium and execute them in one or more processors (or controller). Specifically, FIG. 7 shows a diagrammatic representation of a machine in the example form of a computer system 700 within which instructions 724 (e.g., software or program code) for causing the machine to perform (execute) any one or more of the methodologies described with FIGS. 1, 2, and 4-6. Further, the machine can also be configured to operate the modules of FIG. 3. In addition, the computer system 700 may be used for one or more of the entities (e.g., host system 120, emulator 110) illustrated in the emulation environment 100 of FIG. 1.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708. In addition, the computer system 700 may have a touch sensitive display.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 700 can have different and/or other components than those shown in FIG. 7. In addition, the computer system 700 can lack certain illustrated components. For example, a computer system 700 acting as the emulator 110 may include one or more hardware processors 702, multiple storage units 716, a network interface device 720, and multiple configurable logic circuits (as described above with reference to FIG. 1), among other components, but may lack an alphanumeric input device 712 and a cursor control device 714. For another example, a computer system 700 acting as a host system 120 may include one or more hardware processors 702. The host system 120 with multiple processors 702 may perform multiple simulations in parallel on multiple threads, processes and/or machines. Subset of sections may be distributed either by a user or automatically by a software program to produce a set of signals based on an input set of signals through simulations performed in parallel.

Additional Configuration Considerations

Although in various embodiments described herein, a single reference signal of a logic gate is selected and a waveform of the single reference signal is utilized to determine a duration of one or more input waveforms of one or more input signals to be evaluated for obtaining an output waveform of an output signal, in other embodiments two or more reference signals can be selected and waveforms of the two or more reference signal can be utilized for obtaining the output waveform in a similar manner. Specifically, an event in any of the reference signals results in the periodic pulses of the inputs being transferred to output of the logic gate with appropriate transformation.

Beneficially, the disclosed system and method can achieve resource savings, e.g., processing cycles and memory requirements, in emulation environments. By tracing only a few signals for a DUT, the emulator does not have to trace all signals when testing a particular design. By exchanging values of fewer signals between the emulator and the host system, communication bandwidth can be decreased. In addition, or alternately, throughput may increase between the emulator and the host system.

Moreover, the disclosed configurations improve scalability by using a few traced signals to emulate and verify a particular DUT. For example, more than billions of logic gates of the DUT can be analyzed by tracing a limited number (e.g., tens or hundreds) of signals at the emulator, and reconstructing untraced signals at the host system through simulation as disclosed herein. In addition, additional circuitries (e.g., tracing logic) that are not part of the DUT for verifying the behavior of the DUT do not have to be emulated by the emulator. Accordingly, the capacity of each FPGA of the emulator to emulate the DUT can be reduced, or a larger DUT can be emulated by one or more FPGAs of the emulator. Furthermore, the capacity of a trace memory for tracing a large number of signals can be reduced.

The disclosed system and method beneficially also achieves savings in simulation resources. For example, a waveform of a target signal can be efficiently constructed by simulating logic gates for a selected duration of the time frame, and eschewing simulation of the logic gates for a non-selected duration of the time frame. Furthermore, the simulation of logic gates can be performed based on the detected periodicity of one or more inputs of the logic gates, rather than simulating a large number of logic gates (e.g., more than billions of logic gates) for each clock cycle of the DUT. Accordingly, simulation speed can be drastically improved and the simulation resources (e.g., processor capacity, or storage space) to construct a waveform of a target signal can be reduced. Moreover, the time to construct the waveform of the DUT can be significantly reduced, thereby improving development (circuit designing and verification) times.

It is noted that although the subject matter is described in the context of emulation environment for emulation of digital circuits and systems, the principles described may be applied to analysis of any digital electronic devices. Moreover, while the examples herein are in the context of an emulation environment including FPGAs, the principles described herein can apply to other analysis of hardware implementations of any digital logic circuitries or software simulation such as EDAs.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules (herein may be also referred to as "tools"), or mechanisms, for example, as illustrated in FIGS. 1-6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. Hardware module implemented herein may be implemented in dedicated and permanently configured circuitry, or in temporarily configured circuitry (e.g., configured by software).

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for performing the principles described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium storing instructions, the instructions when executed by one or more processors cause the one or more processors to:
receive, from an emulator, an emulation result of a design under test (DUT) for fabrication, the emulation result including waveforms of signals of the DUT traced by the emulator for a time frame based on emulation of the DUT, the time frame including a plurality of clock cycles;

determine a logic gate from a plurality of logic gates to be evaluated based on the waveforms of the signals of the DUT traced, the plurality of logic gates comprising logic gates included in the DUT;

simulate one or more logic gates coupled to an input signal of the logic gate for a first duration of the time frame;

omit simulation of the one or more logic gates for a second duration of the time frame;

generate an output waveform of an output signal of the logic gate for the time frame based on the simulation of the one or more logic gates for the first duration, the output signal of the logic gate not traced by the emulator; and verify the DUT based on the output waveform prior to fabricating the DUT.

2. The non-transitory computer readable medium of claim 1, wherein the instructions that cause the one or more processors to generate the output waveform of the output signal of the logic gate for the time frame further comprise instructions that cause the one or more processors to:

obtain an input waveform of the input signal of the logic gate for the first duration based on the simulation of the one or more logic gates for the first duration; and determine a periodicity in the input waveform of the input signal of the logic gate in the first duration.

3. The non-transitory computer readable medium of claim 2, wherein the instructions that configure the one or more processors to determine the periodicity in the input waveform of the input signal of the logic gate in the first duration further comprise instructions that configure the one or more processors to:

detect a periodic pattern in the input waveform of the input signal in the first duration; and determine a number of repetitions of the periodic pattern in the input waveform of the input signal in the first duration.

4. The non-transitory computer readable medium of claim 3, wherein the instructions that configure the one or more processors to generate the output waveform of the output signal of the logic gate for the time frame further comprise instructions that configure the one or more processors to:

generate the output waveform of the output signal of the logic gate for the time frame based on the periodic pattern and the number of repetitions of the periodic pattern.

5. The non-transitory computer readable medium of claim 2, wherein the instructions that configure the one or more processors to generate the output waveform of the output signal of the logic gate for the time frame further comprise instructions that configure the one or more processors to:

generate the output waveform of the output signal of the logic gate for the second duration to be in a predetermined state.

6. The non-transitory computer readable medium of claim 2, wherein the instructions that configure the one or more processors to generate the output waveform of the output signal of the logic gate for the time frame further comprise instructions that configure the one or more processors to:

determine another periodicity in another input waveform of another input signal of the logic gate in the second duration; and generate the output waveform of the output signal of the logic gate for the second duration based on said another periodicity in said another input waveform of said another input signal determined in the second duration.

7. The non-transitory computer readable medium of claim 1, further comprising instructions that when executed by the one or more processors cause the one or more processors to:

determine a signal to be used as a reference signal of the logic gate;

determine the first duration of the time frame at which the reference signal is in a first state; and determine the second duration of the time frame at which the reference signal is in a second state different from the first state.

8. The non-transitory computer readable medium of claim 7, wherein the instructions that configure the one or more processors to determine the signal to be used as the reference signal of the logic gate further comprise instructions that configure the one or more processors to:

select another input signal of the logic gate to be the reference signal, said another input signal having a fewer number of repetitions of a periodic pattern than a number of repetitions of another periodic pattern of the input signal.

9. The non-transitory computer readable medium of claim 7, wherein the instructions that configure the one or more processors to determine the signal to be used as the reference signal of the logic gate further comprise instructions that configure the one or more processors to:

select another input signal of the logic gate to be the reference signal, said another input signal coupled to a predetermined port of the logic gate.

10. The non-transitory computer readable medium of claim 1, wherein the input signal of the logic gate is traced by the emulator or is an output signal of another logic gate.

11. The non-transitory computer readable medium of claim 1, wherein the DUT includes a sequential logic gate, the non-transitory computer readable medium further comprising instructions that configure the one or more processors to:

detect, from a waveform of a reference signal of the sequential logic gate, a first time at which a transition in a state of the reference signal occurs;

detect, from another input waveform of another input signal of the sequential logic gate, a second time after the first time, the second time at which a transition from a first state to a second state of said another input signal occurs;

detect, from the waveform of the reference signal, a third time after the second time, the third time at which another transition in the state of the reference signal occurs;

detect, from said another input waveform of said another input signal, a fourth time after the third time, the fourth time at which another transition from the first state to the second state of said another input signal occurs; and generate another output waveform of an output signal of the sequential logic gate between the second time and the fourth time according to the state of the reference signal at the second time.

12. The non-transitory computer readable medium of claim 1, wherein the logic gate is a test circuitry to test behavior of the DUT, the test circuitry not being part of the DUT.

13. A non-transitory computer readable medium storing instructions, the instructions when executed by one or more processors cause the one or more processors to:

determine a first duration of a time frame at which a waveform of a reference signal of a logic gate of a plurality of logic gates is in a first state and a second duration of the time frame at which the waveform of the reference signal is in a second state different from the first state, the time frame including a plurality of clock cycles, the waveform of the reference signal obtained based on an emulation result of a design under test (DUT) generated by an emulator, the plurality of logic gates comprising logic gates included in the DUT;

determine a periodicity in an input waveform of an input signal of the logic gate in the first duration;

generate an output waveform of an output signal of the logic gate for the time frame based on the determined periodicity in the first duration and irrespective of the input waveform of the input signal in the second duration, the output signal of the logic gate not traced by the emulator; and verify the DUT based on the output waveform prior to fabricating the DUT.

14. The non-transitory computer readable medium of claim 13, wherein the instructions that configure the one or more processors to determine the periodicity in the input waveform of the input signal of the logic gate in the first duration further comprise instructions that configure the one or more processors to:

detect a periodic pattern in the input waveform of the input signal in the first duration; and determine a number of repetitions of the periodic pattern in the input waveform of the input signal in the first duration.

15. The non-transitory computer readable medium of claim 14, wherein the instructions that configure the one or more processors to generate the output waveform of the output signal of the logic gate for the time frame based on the determined periodicity in the first duration further comprise instructions that configure the one or more processors to:

generate the output waveform of the output signal of the logic gate for the time frame based on the periodic pattern and the number of repetitions of the periodic pattern.

16. The non-transitory computer readable medium of claim 13, wherein the instructions that configure the one or more processors to generate the output waveform of the output signal of the logic gate for the time frame irrespective of the input waveform of the input signal in the second duration further comprise instructions that configure the one or more processors to:

generate the output waveform of the output signal of the logic gate for the second duration to be in a predetermined state.

17. The non-transitory computer readable medium of claim 13, wherein the instructions that configure the one or more processors to generate the output waveform of the output signal of the logic gate for the time frame irrespective of the input waveform of the input signal in the second duration further comprise instructions that configure the one or more processors to:

determine another periodicity in another waveform of another input signal of the logic gate in the second duration; and generate the output waveform of the output signal of the logic gate for the second duration based on said another periodicity in said another waveform of said another input signal determined in the second duration.

18. The non-transitory computer readable medium of claim 13, further comprising instructions that configure the one or more processors to:

select another input signal of the logic gate to be the reference signal, said another input signal having a fewer number of repetitions of a periodic pattern than a number of repetitions of another periodic pattern of the input signal.

19. The non-transitory computer readable medium of claim 13, further comprising instructions that configure the one or more processors to:

select another input signal of the logic gate to be the reference signal, said another input signal coupled to a predetermined port of the logic gate.

20. The non-transitory computer readable medium of claim 13, further comprising instructions that configure the one or more processors to:

determine to perform simulation of another logic gate coupled to the input signal for the first duration; and determine to omit the simulation of said another logic gate coupled to the input signal to be evaluated for the second duration.

* * * * *